United States Patent
Jang

(10) Patent No.: US 12,343,829 B2
(45) Date of Patent: Jul. 1, 2025

(54) ASSEMBLY AND DISASSEMBLY DEVICE FOR BEARING

(71) Applicant: Jun Young Jang, Changwon-si (KR)

(72) Inventor: Jun Young Jang, Changwon-si (KR)

(*) Notice: Subject to any disclaimer, the term of this patent is extended or adjusted under 35 U.S.C. 154(b) by 967 days.

(21) Appl. No.: 16/347,299

(22) PCT Filed: Dec. 2, 2016

(86) PCT No.: PCT/KR2016/014107
§ 371 (c)(1),
(2) Date: Apr. 26, 2022

(87) PCT Pub. No.: WO2018/084363
PCT Pub. Date: May 11, 2018

(65) Prior Publication Data
US 2023/0219181 A1 Jul. 13, 2023

(30) Foreign Application Priority Data
Nov. 3, 2016 (KR) .......................... 10-2016-0145860

(51) Int. Cl.
*B23P 19/04* (2006.01)
*F16C 43/04* (2006.01)

(52) U.S. Cl.
CPC .............. *B23P 19/04* (2013.01); *F16C 43/04* (2013.01)

(58) Field of Classification Search
CPC ...... F16C 43/04; F16C 2226/14; B23P 19/04; B23P 19/10; B23P 11/02; B23Q 3/00; B23Q 3/06; B23Q 3/104; B23Q 11/143
See application file for complete search history.

(56) References Cited

U.S. PATENT DOCUMENTS

2012/0326402 A1* 12/2012 Grob .................... B23Q 1/0009
279/134

FOREIGN PATENT DOCUMENTS

| JP | 2008-031941 A | 2/2008 |
| KR | 10-2003-0042702 A | 6/2003 |
| KR | 10-2003-0050910 A | 6/2003 |
| KR | 10-2005-0040368 A | 5/2005 |
| KR | 10-2014-0122525 A | 10/2014 |

OTHER PUBLICATIONS

Written Opinion of the International Searching Authority for PCT/KR2016/014107 (Year: 2017).*
International Search Report for PCT/KR2016/014107 mailed Jul. 21, 2017 from Korean Intellectual Property Office.

* cited by examiner

*Primary Examiner* — Christopher J. Besler
(74) *Attorney, Agent, or Firm* — Paratus Law Group, PLLC

(57) ABSTRACT

An assembly and disassembly device for a bearing includes: a pedestal portion provided in a flat plate shape, and provided with a plurality of wheels on a lower portion thereof; first and second horizontal adjusting portions provided on an upper portion of the pedestal portion to control a horizontal movement; first and second vertical adjusting portions respectively coupled to the first and second horizontal adjusting portions to control a vertical movement; first and second bearing supports respectively coupled to the first and second vertical adjusting portions to support a bearing seated on an upper portion thereof; and a bearing heater to heat a bearing seated between the first and second bearing supports.

5 Claims, 4 Drawing Sheets

ASSEMBLY AND DISASSEMBLY DEVICE FOR BEARING

CROSS-REFERENCE TO PRIOR APPLICATIONS

This application is a National Stage Patent Application of PCT International Patent Application No. PCT/KR2016/014107 filed on Dec. 2, 2016 under 35 U.S.C. § 371, which claims priority to Korean Patent Application No. 10-2016-0145860 filed on Nov. 3, 2016, which are all hereby incorporated by reference in their entirety.

BACKGROUND

The present invention relates to an assembly and disassembly device for bearing, and more particularly, to an assembly and disassembly device for bearing that assembles a bearing using thermal expansion of bearing.

In the industrial field (power plant, shipbuilding offshore plant, chemical and oil refinery, etc), rotating machinery is subject to installation and regular periodic inspection. When assembling the rotational machinery, the bearings are assembled to the shaft of the rotating part of the rotational machinery. When inspecting the rotational machinery, it is completely disassembled to perform preventive maintenance such as checking and replacing consumables such as bearings.

Prior art relates merely to coupling with the bearings supported, the bearings are heated to expand by using a torch, an industrial oven, a bearing heater, or the like, and then moved to an assembling device or carried by a manpower. However, there was a problem such as uneven heating of the bearing, damage to the bearing due to the falling of the bearing during the movement, safety accident that the foot or hands were caught, and labor exhaustion due to excessive heating time. Particularly, when dismounting the bearings, the torch was used because industrial ovens and bearing heaters could not be used, resulting in an accident or a serious labor exhaustion.

Therefore, it is required to study not only bearing but also self-heating assembly and disassembly device for bearing.

SUMMARY

The present invention provides an assembly and disassembly device for bearing equipped with a bearing heater to heat bearings on the assembling device.

The present invention provides an assembly and disassembly device for bearing that can assemble bearings by moving them horizontally and vertically at various heights and positions.

According to an embodiment of the present invention, the assembly and disassembly device for bearing may include: a base frame having a flat plate shape and a plurality of wheels at a lower portion thereof; a primary horizontal controller and a secondary horizontal controller, provided at an upper portion of the base frame to control horizontal movement; a primary vertical controller and a secondary vertical controller, respectively coupled to the primary horizontal controller and the secondary horizontal controller to control vertical movement; a primary bearing support and a secondary bearing support, respectively coupled to the primary vertical controller and the secondary vertical controller to support the bearing mounted on the upper part; and a bearing heater to heat bearings mounted between the primary bearing support and the secondary bearing support.

According to an aspect of the present invention, the primary horizontal controller and the secondary horizontal controller may include: a primary horizontal housing and a secondary horizontal housing provided at one side of the base frame in a bent shape; a horizontal control handle provided at one side of the primary horizontal housing; and a driving unit that extends from one side of the horizontal control handle to connect the primary horizontal housing and the secondary horizontal housing to transmit the power of the horizontal control handle.

According to an aspect of the present invention, the primary vertical controller and the secondary vertical controller may include: a primary vertical body and a secondary vertical body coupled to the primary horizontal housing and the secondary horizontal housing respectively and having T-shaped guide grooves; a vertical control handle provided in the primary vertical body; a vertical lift comprising a lift support having a rectangular parallelepiped shape and provided inside the guide grooves of the primary vertical body and the secondary vertical body, a lift coupled to the lower portion of the lift support and operating up and down, and an operating unit extended from one side of the vertical control handle and connected to the lift to transmit the power of the vertical control handle to simultaneously operate the lift support; and a plurality of handles provided on the primary vertical body and the secondary vertical body.

According to an aspect of the present invention, each of the primary bearing support and the secondary bearing support may include: a support body having a protrusion on one side thereof, placed on the upper side of the lift support, wherein the guide groove is coupled to the protrusion, and having an inclined surface on one side at a predetermined angle; a bearing groove provided at a predetermined depth on the inclined surface of the support body; a bearing plate provided on an inner surface of one side of the bearing groove for pressing and fixing a bearing seated in the bearing groove; a plate adjusting screw provided through the surface of one side of the support body and coupled to the bearing plate to control the sliding of the bearing plate; a fall prevention plate to prevent the bearing falling; and a plurality of bearing fall preventing plate rings provided on one side surface of the support body and on which the bearing fall prevention plate is seated.

According to an aspect of the present invention, the bearing heater may include: a plurality of heater probes for heating the bearings including a probe head made of aluminum, a magnet provided on the probe head, a heater element provided in the probe head and generating heat by electricity, and a heater cable connected to the heating element; a power supply connected to commercial electricity to supply electricity; and a heater controller including a switch for turning on and off the bearing heater, a temperature adjusting dial for controlling the temperature of the heater probe, a heater probe operation lamp for checking the operation of the heater probe, and a probe holder for holding the heater probe.

According to an embodiment of the present invention, the assembly and disassembly device for bearing is provided with a bearing heater to heat bearings.

According to an embodiment of the present invention, the present invention provides an assembly and disassembly device for bearing that can assemble and disassemble bearings at various heights and positions by moving them horizontally and vertically.

DETAILED DESCRIPTION

Hereinafter, embodiments of the present invention will be described in detail with reference to the accompanying figures. However, the present invention is not limited to or limited by the embodiments. The reference symbols in the figures denote the same elements.

Figure 1:
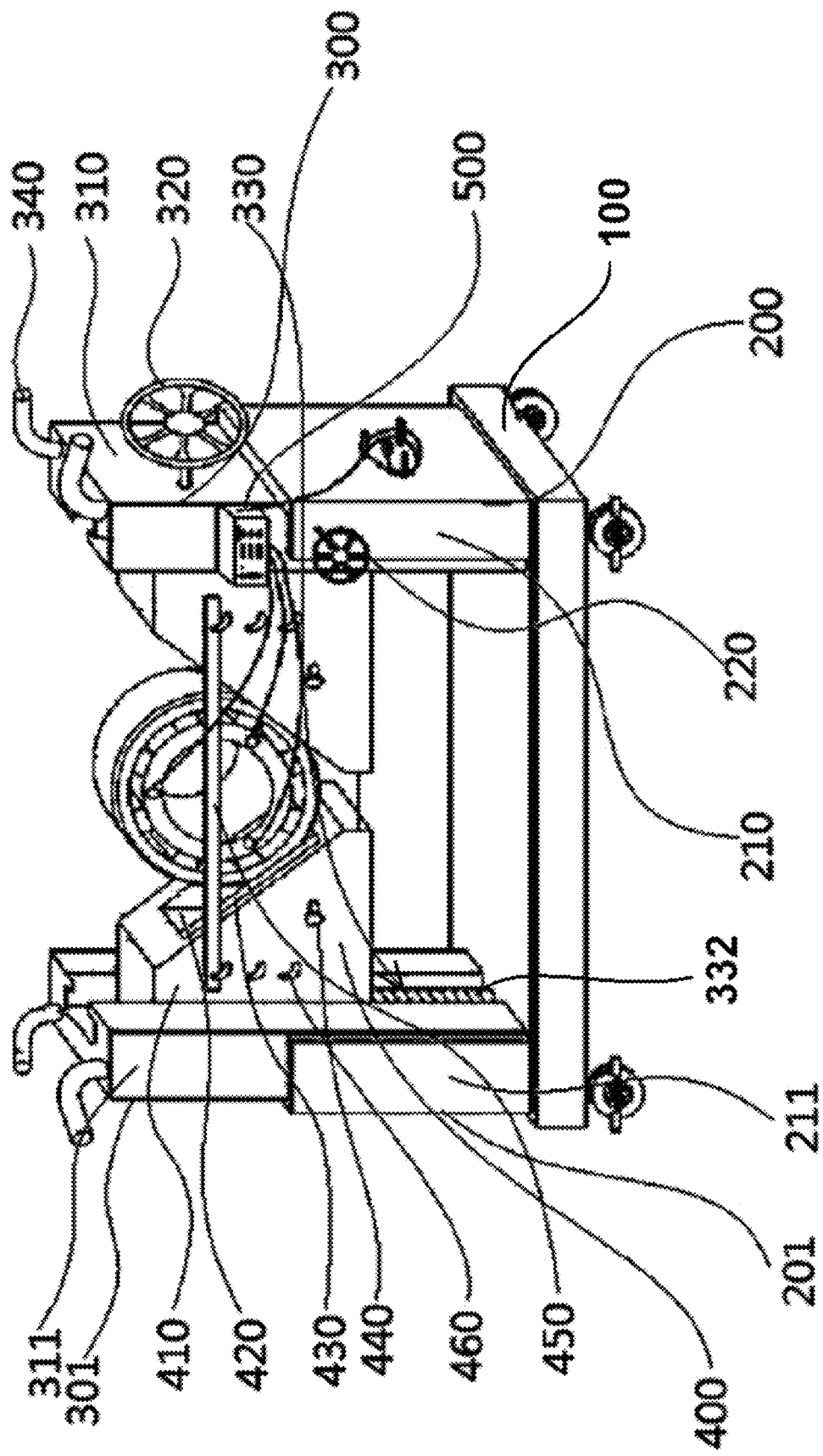
FIG. 1 is a view showing components of an assembly and disassembly device for bearing according to an embodiment of the present invention.

FIG. 1 is a view showing components of an assembly and disassembly device forbearing according to an embodiment of the present invention.

Referring to FIG. 1, an assembly and disassembly device for bearing may include: a base frame (100), a primary horizontal controller (200) and a secondary horizontal controller (201), a primary vertical controller (300) and a secondary vertical controller (301), a primary bearing support and a secondary bearing support (400), and a bearing heater (500).

The base frame (100) may be provided in a flat plate shape, and a plurality of wheels may be provided in a lower portion thereof. A number of wheels at the lower portion have a braking device, such as a brake, to prevent the assembly and disassembly device for bearing from moving during operation.

The primary horizontal controller (200) and the secondary horizontal controller (201) are provided on the base frame (100) to control horizontal movement.

More specifically, the primary horizontal controller (200) and the secondary horizontal controller (201) may include a primary horizontal housing (210), a secondary horizontal housing (211), a horizontal control handle (220), and a driving unit (not shown).

The primary horizontal housing (210) and the secondary horizontal housing (211) may be provided on one side of the upper part of the base frame (100) in a bent shape.

That is, the primary horizontal housing (210) and the secondary horizontal housing (211) are provided on the upper part of the base frame (100) in a bent shape on one side and are combined with the primary vertical controller (300) and the secondary vertical controller (301) to move back and forth the primary vertical controller (300) and the secondary vertical controller (301) at the same time.

The horizontal control handle (220) may be provided on one side of the primary horizontal housing (210).

More specifically, the horizontal control handle (220) may be provided in the primary horizontal housing (210) to control the forward and backward movement of the primary horizontal housing (210) and the secondary horizontal housing (211).

The driving unit extends from one side of the horizontal control handle (220) and connect the primary horizontal housing (210) and the secondary horizontal housing (211) to transmit the power of the horizontal control handle (220).

More specifically, the driving unit is connected to the horizontal control handle (220), the primary horizontal housing (210), and the secondary horizontal housing (211) to convert the rotational force of the horizontal control handle (220) into a linear motion so that the housing (210) and the secondary horizontal housing (211) can move back and forth.

Without a driving unit, operation is inconvenient because the primary horizontal housing (210) and the secondary horizontal housing (211) need to be separately adjusted, and there is a risk of the bearing falling by being twisted when moving back and forth.

The primary vertical controller (300) and the secondary vertical controller (301) are coupled to the primary horizontal controller (200) and the secondary horizontal controller (201) to control vertical movement.

In more detail, the primary vertical controller (300) and the secondary vertical controller (301) may include a primary vertical body (310), a secondary vertical body (311), a vertical control handle (320), a vertical lift (330) and a handle (340).

The primary vertical body (310) and the secondary vertical body (311) are coupled to the primary horizontal housing (210) and the secondary horizontal housing (211), respectively, and may be provided with a T-shaped guide groove.

In more detail, the primary vertical body (310) and the secondary vertical body (311) may be coupled with a primary horizontal controller (200) and the secondary horizontal controller (201) to move back and forth, and coupled to the primary bearing support and the secondary bearing support (400) with a T-shaped guide groove provided.

The vertical control handle (320) may be provided in the primary vertical body (310).

More specifically, the vertical control handle (320) is provided in the primary vertical body (310) and connected to the vertical lift (330) to control the vertical lift (330) to control the vertical movements of the primary and secondary bearing supports (400).

The vertical lift (330) may include a rectangular parallelepiped lift support (not shown) provided inside the primary vertical body (310) and the secondary vertical body (311), a lift (332) coupled to the lower portion of the lift support, and an operating unit (not shown) extending from one side of the vertical control handle (320) and connected to the lift (332) to transmit the power of the vertical control handle (320) to simultaneously operate the lift support.

More specifically, the lift support contacts the lower part of the primary and secondary bearing supports (400) to support the primary and secondary bearing supports (400), and the lift (332) connected to the lower portion of the lift support can operate up and down. The operating unit is connected to the vertical control handle (320) to convert the rotational force of the vertical control handle (320) into a linear motion force and transmits the force to both sides at the same time.

Without the operating unit, operation is inconvenient as in the case of the driving unit, and the bearing may fall due to the height difference.

The primary and secondary bearing supports (400) are coupled to the primary vertical controller (300) and the secondary vertical controller (301), respectively, and can support bearings that are seated on the top.

More specifically, it may include a support body (410), a bearing groove (420), a bearing plate (430), a plate adjusting screw (440), a fall prevention plate (450), and a fall prevention plate ring (460).

The support body (410) has a protrusion on one side, and is positioned on the lift support with guide groove and protrusion coupled together, and may be provided with a surface inclined at a predetermined angle.

More specifically, the support body (410) is a body on which the bearing is placed, and is positioned on the lift support. The protrusion of the support body (410) is coupled with the T-shaped guide grooves of the primary vertical body (310) and the secondary vertical body (311) to prevent movement other than the vertical movement by the vertical lift (330).

The bearing groove (420) may be provided on the inclined surface of the support body (410) to a predetermined depth.

More specifically, the support body (410) may be provided with a groove to a predetermined depth to prevent the bearing from falling after the bearing is seated.

The bearing plate (430) is provided on the inner surface of one side of the bearing groove (420), and can slide and fix the bearing seated on the bearing groove (420).

More specifically, since the bearing plate (430) may not be fixed according to the specification of the bearing mounted on the bearing groove (420), the bearing plate (430) may slide so that the bearing can be closely fixed to the inner surface of the bearing groove (420).

The plate adjusting screw (440) is provided through one surface of the support body (410) and coupled to the bearing plate (430) to control the sliding of the bearing plate (430).

More specifically, when the plate adjusting screw (440), which is connected to the bearing plate (430), is rotated to the right according to the rotation of the screw, the plate adjusting screw (440) advances, the bearing plate (430) moves toward the bearing. When rotated to the left, the plate adjusting screw (440) moves backward to retract the bearing plate (430).

The bearing fall prevention plate (450) can prevent the bearing fall.

It may be provided on one side of the support body (410) to prevent bearings from falling due to movement of the assembly and disassembly device for bearing, operation of the primary horizontal controller (200) and the secondary horizontal controller (201), operation of the primary vertical controller (300) and secondary vertical controller (301), and separation of the bearing plate (430).

A plurality of bearing fall prevention plate rings (460) are provided on one side of the support body (410), and the bearing fall prevention plate (450) can be seated.

More specifically, the fall prevention plate (450) prevents the bearing from falling down, but should be easy with removal since it may interfere with bearing mounting.

Accordingly, a bearing preventive plate ring (460) is provided on one side of the support body (410) for an easy detachment of the bearing fall prevention plate (450), and a plurality of bearing fall prevention plate rings (460) can be provided since the height of the bearing prevention plate (450) must be adjusted according to the size of the bearing.

Figure 2:
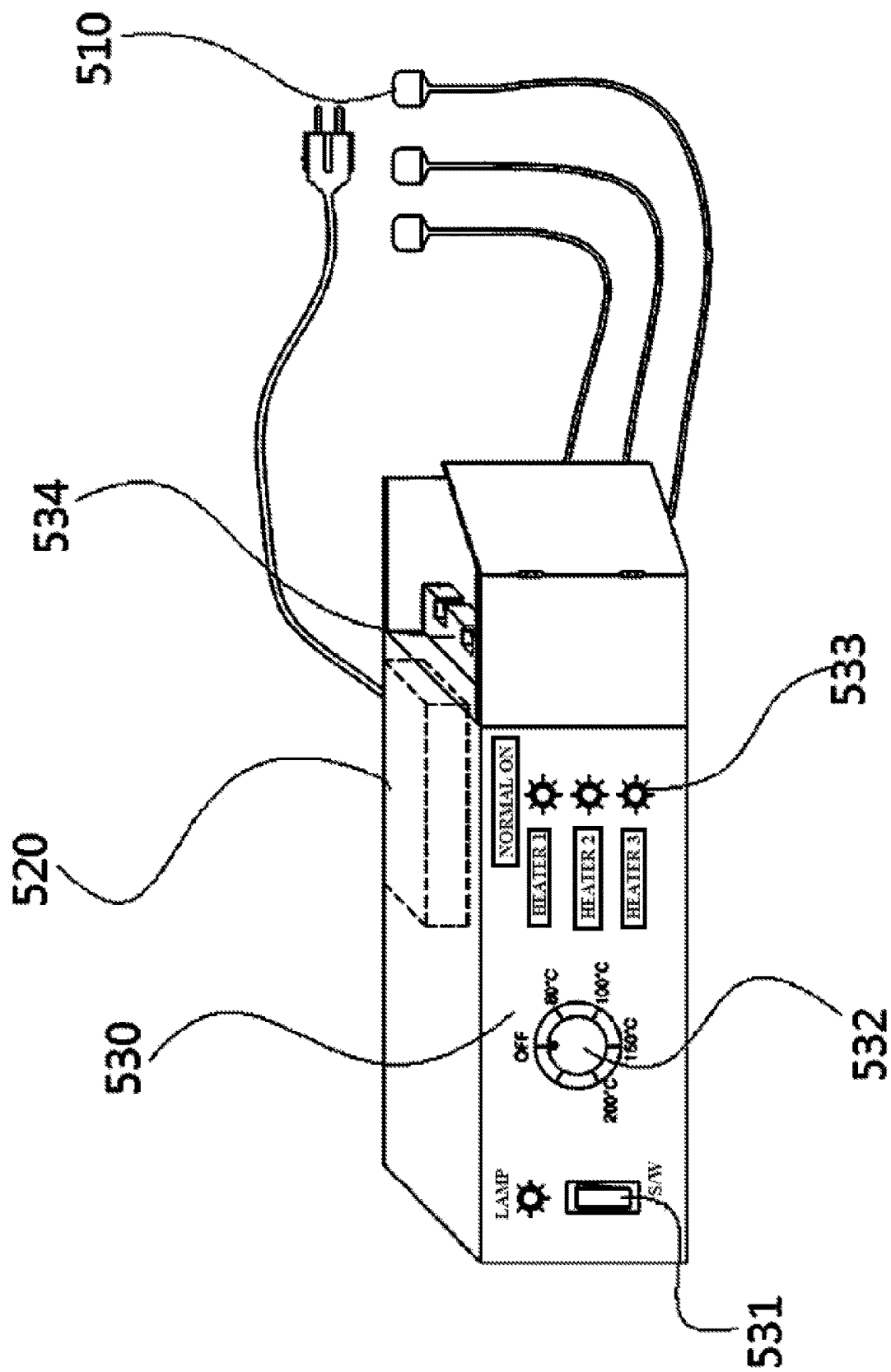
FIG. 2 is a view showing a bearing heater according to an embodiment of the present invention.

FIG. 2 is a view showing a bearing heater (500) according to an embodiment of the present invention.

Figure 3:
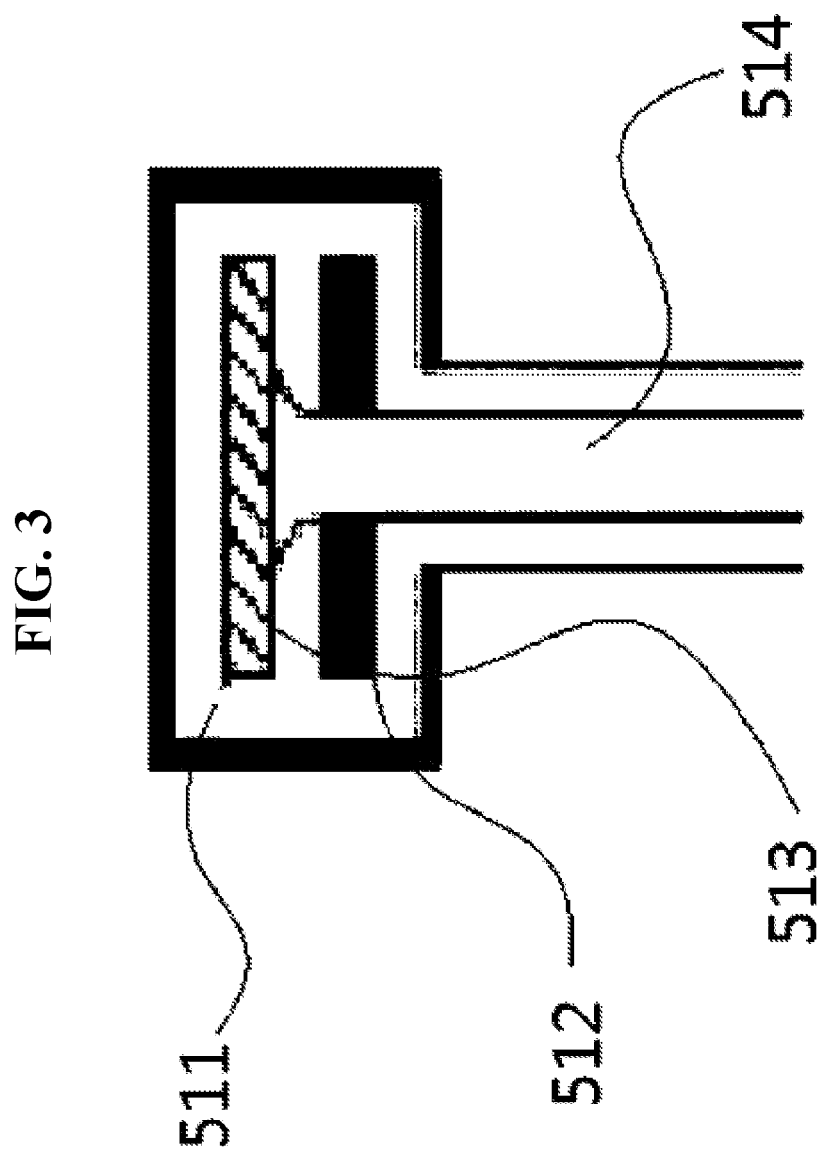
FIG. 3 is a view showing a heater probe of the bearing heater according to an embodiment of the present invention.

FIG. 3 is a view showing a heater probe (510) of the bearing heater (500) according to an embodiment of the present invention.

Referring to FIGS. 1 to 3, the bearing heater (500) can heat the bearing that is placed between the primary and secondary bearing supports (400).

More specifically, the bearing heater (500) may include a heater probe (510), a power supply (520), and a heater controller (530).

A plurality of heater probes (510) include a probe head (511) made of aluminum, a magnet (512) provided in the probe head (511), a heating element (513) provided in the probe head (511) and generating heat by electricity, and a heater cable (514) connected to the element (513) and can heat the bearing.

The probe head (511) may be made of aluminum. Since aluminum has good thermal conductivity after gold, silver and copper, and is cheaper than the metals listed above and has excellent mechanical properties such as hardness, tensile strength, yield strength and rigidity, it can be used as material for the probe head (511) that needs heat conductivity.

The magnet (512) may be provided in the probe head (511).

In more detail, the magnet (512) may be provided in the probe head (511) for an easy removal of the bearing and the heater probe (510). The magnet (512) can also be electromagnet.

The heating element (513) is provided in the probe head (511) and can be heated by electricity.

More specifically, the heating element (513) can heat the bearing when electric power is supplied.

The heater cable (514) can be connected to the heating element (513).

More specifically, the heater cable (514) may be connected to the heating element (513) to supply power, and the surface of the heater cable (514) should be coated with an insulating material so that no electricity leaks out. Further, when an electromagnet is used for magnet (512), the electromagnet can be powered.

The power supply (520) can be connected to commercial electricity to supply electricity.

In more detail, the power supply (520) may be connected to commercial power to supply power to the heater controller (530).

The heater controller (530) may include a switch (531) for turning the bearing heater (500) on and off, a temperature control dial (532) for controlling the temperature of the heater probe (510), a heater probe operation lamp (533) for checking the operation of the heater probe (510), and a probe holder (534) for holding the heater probe (510).

More specifically, when the switch (531) turns the bearing heater (500) on and off and the temperature control dial (532) controls the temperature of the heater probe (510), it is possible to check whether or not each of the heater probes (510) is activated through the heater probe operation lamp (533). After using the heater probe (510), it can be stored in the probe holder (534).

Hereinafter, the operation of the assembly and disassembly device for bearing will be described in more detail.

Figure 4:
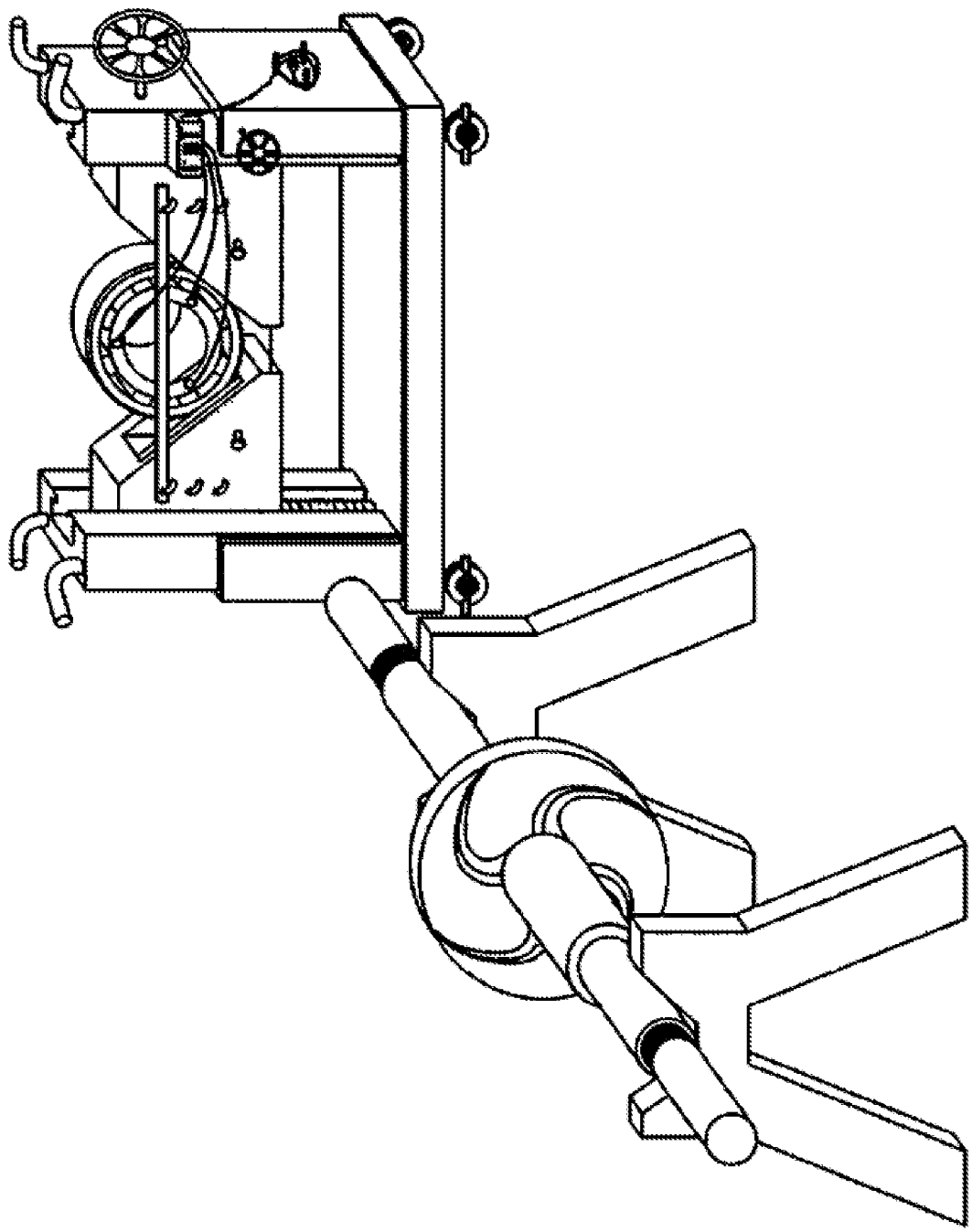
FIG. 4 is a view showing an assembly and disassembly device for bearing before bearing coupling according to an embodiment of the present invention.

FIG. 4 is a view showing an assembly and disassembly device for bearing before bearing coupling according to an embodiment of the present invention.

Referring to FIGS. 1 to 4, a bearing to be initially assembled is placed in a bearing groove (420) on primary and secondary bearing supports (400). Thereafter, the bearing adjusting screws (440) are rotated, respectively, so that a bearing plate (430) provided on the inner surface of the bearing groove (420) presses the bearings to be brought into close contact with the support body (410).

Then, the bearing fall prevention plate (450) is coupled to the bearing fall preventive plate ring (460) corresponding to the bearing height to protect the bearing once more, the handle (340) is moved to the vicinity of the shaft, and the vertical control handle (220) is rotated, and the primary and secondary bearing supports (400) are simultaneously raised and lowered by the vertical lift (330) to align the center of the shaft with the center of the inner ring of the bearing.

The wheels attached to the base frame (100) are braked, the outlet provided in the power supply (530) of the bearing heater (500) is powered, and the heater probe (510) mounted on the probe base (534) is attached to the inner ring of the bearing. Then it is fixed by the magnet (512).

Thereafter, when the switch (531) of the heater controller (530) is turned on and the temperature control dial (532) is turned to increase the temperature, it is possible to check whether electricity is supplied to the probe head (511) through the heater cable (514) of the heater probe (510) by way of checking whether the lamp of the operation lamp (533) is lit.

When the operation lamp (533) is lit, the heating element (513) inside the probe head (511) heats up to heat the bearing, and the heated bearing expands along with the bearing diameter.

At this time, when the switch (531) is turned down and the operation lamp (533) is turned off, the falling prevention plate (450) is separated and the horizontal control handle (220) provided in the primary horizontal housing (210) is rotated, then the primary horizontal housing (210) and the secondary horizontal housing (211) are advanced forward by the driving unit and moved to the bearing mounting position.

Thereafter, the heater probe (510) is removed and the bearing adjusting screw (440) is rotated to separate the bearing plate (430) from the bearing. Then, the vertical lift handle (330) is rotated to lower the vertical lift (330) so that the bearings are separated. The horizontal control handle (220) is rotated so that the primary horizontal housing (210) and the secondary horizontal housing (211) are retracted back to their original positions, then the brakes of the base frame (100) are released to move again and the bearing assembly is finished.

Disassembly is performed in the reverse order of the above-mentioned procedure. To remove the heater probe (510), the bearing coupled to the shaft should be heated and removed first.

Also, the assembly and disassembly device for bearing can be used to assemble and disassemble not only bearings but also coupling hubs.

As described above, according to an embodiment of the present invention, an assembly and disassembly device for bearing may be provided with a bearing heater (500) to heat bearings on the assembling device.

Also, according to an embodiment of the present invention, it is possible to provide an assembly and disassembly device for bearing that can assemble and disassemble the bearings at various heights and positions by moving them horizontally and vertically.

While the present invention has been particularly shown and described with reference to exemplary embodiments thereof, it is to be understood that the invention is not limited to the above-described embodiments, but, on the contrary, that various modifications and variations can be made by those skilled in the art. Accordingly, it is to be understood that an embodiment of the present invention should be understood only by the appended claims, and all equivalents or equivalent variations thereof are included in the scope of the present invention.

The invention claimed is:

1. An assembly and disassembly device for handling a bearing, comprising:
   a base frame having a flat plate shape and a plurality of wheels at a lower portion thereof;
   a first vertical frame and a second vertical frame, which are provided at an upper portion of the base frame to face each other and are forwardly or backwardly movable together in a horizontal direction on the upper portion of the base frame;
   a first vertical lift column and a second vertical lift column, respectively coupled to the first vertical frame and the second vertical frame to face each other and respectively extend upward over the first vertical frame and the second vertical frame in a vertical direction;
   a first bearing support block and a second bearing support block, respectively coupled to the first vertical lift column and the second vertical lift column to face each other and configured to jointly support a bearing placed thereon during handling, wherein the first bearing support block and the second bearing support block are movable together on the first vertical lift column and the second vertical lift column in the vertical direction; and
   a bearing heater configured to heat the bearing placed on the first bearing support block and the second bearing support block.

2. The assembly and disassembly device of claim 1,
   wherein the first vertical frame and the second vertical frame include:
   a first housing and a second housing each provided on one side of the base frame in a bent shape; and
   a horizontal control wheel provided on one side of the first housing, and mechanically connected to the first housing and the second housing such that the first housing and the second housing are forwardly and backwardly movable together in the horizontal direction when the horizontal control wheel is rotated.

3. The assembly and disassembly device of claim 2,
   wherein the first vertical lift column and the second vertical lift column include:
   a first vertical column and a second vertical column coupled to the first housing and the second housing respectively, and each having a guide groove;
   a vertical control wheel provided on the first vertical column;
   a first vertical lift and a second vertical lift respectively mounted on the first vertical column and the second vertical column and connected to the first bearing support block and the second bearing support block, and being configured to move up or down the first bearing support block and the second bearing support block in the vertical direction; and
   a plurality of handle bars provided on the first vertical column and the second vertical column.

4. The assembly and disassembly device of claim 3,
   wherein each of the first bearing support block and the second bearing support block includes:
   a support body having a protrusion coupled to the guide groove, and an inclined surface with a predetermined angle;
   a bearing groove provided at a predetermined depth on the inclined surface of the support body;
   a bearing plate provided on an inner surface of the bearing groove, and configured to press and fix the bearing seated in the bearing groove while the bearing is loaded on the first bearing support block and the second bearing support block;
   a plate adjusting screw provided through a surface of the support body and coupled to the bearing plate to control a movement of the bearing plate;
   a fall prevention plate configured to be located across a gap between the first bearing support block and the second bearing support block to prevent the bearing loaded on the first bearing support block and the second bearing support block from falling; and
   a plurality of bearing fall preventing plate rings provided on an outer surface of the support body and on which the fall prevention plate is seated.

5. The assembly and disassembly device of claim 4, wherein, the bearing heater includes:
a plurality of heater probes configured to heat the bearing placed on the first bearing support block and the second bearing support block, and including a probe head made of aluminum, a magnet provided on the probe head, a heating element provided in the probe head and configured to generate a heat by electricity, and a heater cable connected to the heating element;
a power supply connected to commercial electricity to supply electricity; and
a heater controller including a switch for turning on and off the bearing heater, a temperature adjusting dial for controlling a temperature of the plurality of heater probes, a heater probe operation lamp for checking an operation of the plurality of heater probes, and a probe holder for holding the plurality of heater probes.

\* \* \* \* \*